Patented Nov. 23, 1948

2,454,649

UNITED STATES PATENT OFFICE 2,454,649

PYROLIGNEOUS LIQUORS FOR PRESERVING FOOD PRODUCTS AND METHOD OF PREPARING THE SAME

Henri Martin Guinot, Versailles, France, assignor to Les Usines De Melle (Societe Anonyme), Saint-Leger-les-Melle, France, a company of France No Drawing. Application March 17, 1945, Serial No. 583,372. In France March 3, 1942

Section 1, Public Law 690, August 8, 1946
Patent expires March 3, 1962

8 Claims. (Cl. 99—222)

It is already known to subject perishable foodstuffs such as meat, fish etc. to a "liquid smoke" treatment consisting in immersing the foodstuffs for a time in a pyroligneous liquid produced from wood carbonization.

The foodstuffs thus treated keep perfectly and possess a very pleasant smoke-cure smell. However, an unbearable flavour ascribable to aliphatic acids in the pyroligneous liquid is experienced on tasting. Butyric acid which is one of said aliphatic acids is particularly undesirable in this respect, as well as formic acid which imparts a burning flavour and is somewhat toxic.

When attempts are made to neutralize acids in pyroligneous liquid by means of lime or sodium carbonate, a double drawback arises. On the one hand, those tars which are soluble in pyroligneous liquid and owing to which perishable foods thus treated are found to keep well, are precipitated to a large extent and the detarred pyroligneous liquid has lost all its valuable properties. On the other hand, on drying, fish or meat thus cured become coated with a whitish film constituted by fatty acid salts. Finally flavour is improved to an insufficient degree.

It is an object of this invention to provide a method whereby a perfect result is attained both in respect of preservation and in respect of flavour and bouquet.

According to this invention, pyroligneous liquid is first subjected to a double extraction by means of solvents as set forth in U. S. Patents 1,884,241 and 1,958,547 with a view to extracting therefrom successively (a) creosoted or other tars which provide for preservation of meat or fish and impart smoke taste and aroma thereto, (b) those aliphatic acids which are present in detarred liquid.

To the de-acidified liquid, previously freed from any small amount of solvent retained in solution, is then added, according to this invention, the whole or only a part of the oils or tars separated in the first extraction step and previously de-acidified in any known manner, for instance by being treated with a product having a slightly alkaline reaction, e. g. bicarbonate of soda.

Owing to the foregoing treatment, tars are simultaneously refined to some extent, as fractions having for instance an insufficiently satisfactory flavour or showing a certain toxicity are removed thereby. When the tar thus treated is particularly rich in undesirable substances, it is advantageous further to refine it by subjecting de-acidified tars to a supplemental fractionate distillation, preferably in a vacuo, so as to remove the undesirable substances while retaining only those fractions which are useful for the purpose aimed at and are returned into the de-acidified liquid.

I thus succeed in restoring an improved pyroligneous liquid which is perfectly fit for curing perishable foodstuffs to be preserved.

As described in the above mentioned U. S. Patent 1,958,547, I may use one solvent for performing the two successive extractions, for instance ethyl acetate, which is employed by small amounts (about 25 volumes per cent) for extracting tars and by a larger amount (about 250 volumes per cent) for de-acidifying. With amyl acetate, the proportion to be used are 25 and 400 volumes respectively.

Different solvents may also be used in the second extraction step, for instance butylcresol for removing tars (20 volumes) and a ketone such as mesityl oxide, butyrone, cyclohexanone and the like for removing acids.

I may bring about detail alterations in the above method without departing from the spirit of this invention. For instance when the same solvent is used in both extraction steps, it may be found of interest to admix the de-acidified liquid with the de-acidified tars before removing said solvent through distillation.

Again, it may be more advantageous to redissolve tars in pure water instead of de-acidified pyroligneous liquid.

Besides simplification, my method has the advantage of yielding a final cure liquid free from particular substances which are present in crude pyroligneous liquid and exhibit no valuable property in respect of preservation but offer drawbacks in respect of flavour. Said substances can be extracted but with difficulties by means of solvents from their aqueous solutions and hence are retained for the most part in de-acidified aqueous liquid.

On the other hand, I have further found that instead of completing tar refining by means of a fractionate distillation as above described, it is often preferable to produce a like purification by treating with one or more suitably chosen solvents, capable selectively of extracting the undesirable components. The treatment may be performed on cold, thus enabling of avoiding taste and odour alterations frequently caused by distillation even when the latter is performed in a vacuo.

I may also effect a previous steam distillation of the pyroligneous liquid before extraction by means of solvents, in order to remove particular undesirable fractions of light oils.

The foregoing modification may be performed as hereinafter described.

Pyroligneous liquor is subjected to steam distillation; in the process, methanol and acetone, then wood oils which are rich in products exhibiting an aldehydic reaction and are discarded, are obtained. As water is present, said wood oils the boiling range of which extends to about 150° C., distill as azeotropes at a temperature not higher than about 95° C. The following distillation fraction comprises heavy oils which are partially soluble in water and possess the characteristic smoke-cure odour. These "smoke oils" which constitute the valuable active substances in pyroligneous liquid have a composition like that of products obtained by solvent extraction, let alone certain undesirable wood oil fractions. They are obtained in admixture with a very large proportion of water and owing to this fact, they distill at a temperature very close to 100° C. at atmospheric pressure. The distillate is substantially homogeneous and is a diluted solution of "smoke oils," containing acetic acid.

Said diluted solution is then extracted by means of solvents as above described, with a view to isolating smoke oils which after de-acidification in any suitable manner, for instance by washing with a small amount of water or treatment with sodium bicarbonate, are re-dissolved in pure water in a suitable proportion, with a view to producing a liquor adapted for preserving foodstuffs.

The distillation residue is constituted by heavy tars which are without interest for the purpose aimed at.

It is advantageous to perform steam distillation under a subatmospheric pressure in order still to lower boiling point and thus avoid alterations of products.

Generally speaking, the amount of water in original pyroligneous liquid suffices to carry "smoke oils" along with it. Nevertheless it may be advantageous to provide an additional supply of water to the boiler, possibly in form of steam.

Instead of directly distilling pyroligneous liquor, it may also be neutralized beforehand. In this case, solvent extraction of distilled "smoke oils" is no longer necessary; but it may be contemplated with a view to producing concentrated oils from which aqueous solutions concentrated at will can be prepared. However, previous neutralization is a costly process which further has the drawback of materially altering certain active components of the pyroligneous liquid by producing heavy tars therein.

Finally, steam distillation may be performed in a continuous or discontinuous manner.

The following examples which have no limitative character will show how my invention may be carried out.

*Example 1.*—I started from a pyroligneous liquid produced for carbonization of birch wood and having the following composition:

| | Percent |
|---|---|
| Water | 82 |
| Methanol | 2.5 |
| Acetone | 0.5 |
| Acetic acid and homologues | 8 |
| Tars | 7 |

At an end of an extraction battery, which may be of any type, I continuously introduced at a rate of 100 litres per hour, the said pyroligneous liquid which was passed therethrough in counter-current with ethyl acetate supplied at the other end of the battery at a rate of 25 litres per hour.

The solvent flowing from the outlet of the battery had the following composition:

| | Percent |
|---|---|
| Ethyl acetate | 62 |
| Acetic acid | 6 |
| Tars | 20 |
| Water | 12 |

As to detarred pyroligneous liquid, its composition was:

| | Percent |
|---|---|
| Water | 77 |
| Acid | 6.5 |
| Tars | 2 |
| Methanol | 2.5 |
| Acetone | 0.5 |
| Ethyl acetate | 11.5 |

The detarred pyroligneous liquid was again treated in a second extraction battery by means of ethyl acetate supplied at a rate of 200 litres per hour. It was thus completely de-acidified so that the product leaving the second battery was only water saturated with ethyl acetate and containing in solution methanol and acetone.

The solvent laden with tars from the first extraction and having the above composition was neutralized by means of sodium bicarbonate, in the presence of an equal volume of water. A very small proportion of tars passed in solution into water together with sodium acetate produced. Upon decantation, I obtained ethyl acetate containing in solution only tars (150 to 200 g. per litre) and water (80 g. per litre).

This extract was admixed with the de-acidified pyroligneous liquid. The mixture was placed in a boiler with a superimposed distilling column, wherein methanol and ethyl acetate were distilled off while tars gradually dissolved in water. After cooling and if need be decantation of any tar fraction which could not be dissolved, I obtained a product fit for cure. It was practically free from organic acid (less than 1 gram per litre) and its tar content varied from 30 to 40 grams per litre. According to the purpose aimed at, the solution may be either diluted with water or concentrated, with a view to decreasing or increasing the proportion of tars therein.

In order that the method may be economical, it is obviously necessary to recover ethyl acetate. The apparatus was then completed by a distillation column for recovery of ethyl acetate used to extract acid in the second battery.

*Example 2.*—I worked as disclosed in Example 1 but instead of neutralizing with sodium bicarbonate the extract laden with tars, I de-acidified it by washing it in counter-current with an equal volume of water. I thus secured the advantage of removing certain tar components which are not desirable in the cure liquid and are just the more soluble in diluted acetic acid. Hence diluted acetic acid played in this case, the part of a purifying solvent.

After the washing step, ethyl acetate contained only about 100 grams of tar per litre. I delivered it to a distilling kettle containing such an amount of water that the final tar content was the one desired for the liquid, for instance 20 grams per litre. Ethyl acetate was expelled therefrom by boiling, and recovered for a further extraction.

While I have described what I deem to be reliable and efficient embodiments of my invention, I do not wish to be limited thereto as many modifications may be brought therein by those skilled in the art without departing from the spirit of the appended claims. Specifically the removal of solvent from extracts may be performed before de-acidification of said extracts.

What I claim is:

1. In a process for the production of a foodstuff cure from a pyroligneous liquor, the steps of extracting said liquor by means of a solvent for the tarry components of the liquor, thereby obtaining an extract containing a large proportion of said tarry components and a small proportion of acids, de-acidifying said extract at a temperature below the point of incipient distillation of said tarry components in said extract, in the presence of no more water than about the volume of said extract; and dissolving the de-acidified extract in a substantially neutral aqueous medium; in combination with the step of removing said solvent from said extract at a stage after the said extraction step.

2. In a process for the production of a foodstuff cure from a pyroligneous liquor, the steps of extracting said liquor by means of a solvent for the tarry components of the liquor, to obtain an extract containing a large proportion of said tarry components and a small proportion of acids and an acid-containing residue; de-acidifying said extract at a temperature below the point of incipient distillation of said tarry components in said extract, in the presence of no more water than about the volume of said extract; separately de-acidifying said residue; and dissolving at least a part of said de-acidified extract in said de-acidified residue; in combination with the step of removing said solvent from said extract at a stage after the said extraction step.

3. In a process for the production of a foodstuff cure from a pyroligneous liquor, the steps of extracting said liquor by means of a solvent for the tarry components of the liquor, to obtain a first extract which contains a large proportion of said tarry components and a small proportion of acids and a first residue which contains a larger amount of acids than said extract; de-acidifying said extract at a temperature below the point of incipient distillation of said tarry components in said extract, in the presence of no more water than about the volume of said extract; extracting said first residue by means of a solvent for said acids therein, to obtain a second extract and a de-acidified second residue; and dissolving at least a part of said de-acidified first extract in said de-acidified second residue; in combination with the step of removing said solvents from the first extract and from the second residue at stages after the first and second extraction steps respectively.

4. In a process for the production of a foodstuff cure from a pyroligneous liquor, the steps of extracting said liquor by means of a minor proportion of a solvent having greater solvent properties with respect to the tarry components of said liquor than with respect to the acid components thereof, so as to obtain a first extract containing a large portion of said tarry components and a small portion of said acid components, and a first residue containing the remainder of said acid components and the remainder of said tarry components; de-acidifying said extract at a temperature below the point of incipient distillation of said tarry components in said extract, in the presence of no more water than about the volume of said extract; extracting said first residue by means of a major proportion of the same solvent, so as to obtain a substantially de-acidified second residue; and dissolving at least a part of said de-acidified first extract in said second residue; in combination with the step of removing solvent from said first extract and said second residue at stages after the first and second extraction steps respectively.

5. In a process for the production of a foodstuff cure from a pyroligenous liquor, the steps of extracting said liquor by means of a solvent for the tarry components of the liquor, to obtain an extract containing a large portion of said tarry components and a small portion of the acid components of said liquor; neutralizing said extract by means of an alkaline agent in a volume of water which is not substantially larger than the volume of said extract, thereby obtaining a decantable mixture, causing said mixture to settle into an aqueous layer containing the alkaline salts of said portion of acid components, and a non-aqueous layer containing said solvent and said large portion of tarry components; separating said non-aqueous layer; and dissolving said non-aqueous layer in a substantially neutral, aqueous medium; in combination with the step of removing said solvent from said aqueous layer at a stage after production of said layer.

6. In a process for the production of a foodstuff cure from a pyroligneous liquor, the steps of extracting said liquor by means of a solvent for the tarry components of the liquor, to obtain an extract containing a large portion of said tarry components and a small portion of the acid components of said liquor; washing said extract countercurrently with a volume of water which is not substantially larger than the volume of said extract, to remove said acid components; separating the extract thus de-acidified from said wash water; diluting said de-acidified extract with a major proportion of water, to obtain a solvent-containing aqueous mixture; and removing solvent from said aqueous mixture.

7. A process for the production of a foodstuff cure which comprises passing a pyroligneous liquor countercurrently with a minor proportion of a lower alkyl ester of acetic acid through an extraction zone, to obtain a first extract and a first residue; passing said first residue countercurrently with a major proportion of said ester through an extraction zone, to obtain a second extract and a second residue; neutralizing said first extract with an alkaline agent in a volume of water substantially equal to the volume of said extract, thereby obtaining a decantable mixture; causing said mixture to settle into an aqueous layer and a non-aqueous layer; separating said layers; combining said non-aqueous layer with said second residue, to obtain a second mixture; and distilling said second mixture to remove said ester therefrom.

8. In a process for the production of a foodstuff cure from a pyroligneous liquor, the steps of subjecting said liquor to steam distillation; separately collecting that fraction of said liquor which distills at a temperature averaging about 100° C. under atmospheric pressure; extracting said fraction by means of a solvent for the tarry components of the liquor, thereby obtaining an extract containing a large proportion of said tarry components and a small proportion of acids; de-acidifying said extract at a temperature below the point of incipient distillation of said tarry components in said extract, in the presence of no more water than about the volume of said extract and dissolving the de-acidified extract in water; in combination with the step of removing said solvent from said extract at a stage after the said extraction step.

HENRI MARTIN GUINOT.

REFERENCES CITED

The following references are of record in the file of this patent:

UNITED STATES PATENTS

| Number | Name | Date |
|---|---|---|
| 1,884,241 | Ricard et al. | Oct. 25, 1932 |
| 1,917,338 | Stone | July 11, 1933 |
| 1,959,547 | Ricard et al. | May 22, 1934 |
| 2,129,047 | Colgin | Sept. 6, 1938 |
| 2,376,663 | Coutor | May 22, 1945 |

FOREIGN PATENTS

| Number | Country | Date |
|---|---|---|
| 359,007 | Great Britain | Oct. 12, 1931 |

OTHER REFERENCES

"Food Inspection & Analysis," 1920, by A. E. Leach, page 215.

"The Microbiology of Foods," 1944, by F. W. Tanner, pages 860 and 861.

"Marine Products of Commerce," 1923, by D. K. Tressler, pages 352 and 353.